United States Patent [19]

Karino et al.

[11] Patent Number: 4,515,737
[45] Date of Patent: May 7, 1985

[54] PROCESS FOR PRODUCING COMPOSITE PLASTIC PIPE

[75] Inventors: Saburo Karino, Osaka; Yoshiaki Ishida, Nara, both of Japan

[73] Assignee: Dainippin Ink and Chemicals Inc., Tokyo, Japan

[21] Appl. No.: 554,816

[22] Filed: Nov. 23, 1983

Related U.S. Application Data

[63] Continuation-in-part of Ser. No. 267,769, May 28, 1981, abandoned.

[30] Foreign Application Priority Data

May 28, 1980 [JP] Japan .................................. 55-70073
May 28, 1980 [JP] Japan .................................. 55-70076

[51] Int. Cl.³ ............................................. H05B 3/00
[52] U.S. Cl. ................................. 264/22; 156/244.12; 156/244.13; 156/244.17; 156/172; 264/103; 264/135; 264/137; 264/173
[58] Field of Search ................. 264/22, 135, 137, 173, 264/103, 174; 156/244.12, 244.13, 244.17, 244.19

[56] References Cited

U.S. PATENT DOCUMENTS

| | | | |
|---|---|---|---|
| 3,616,072 | 10/1971 | Bostrom | 156/244.13 |
| 3,756,890 | 9/1973 | Galloway et al. | 156/244.13 |
| 3,769,127 | 10/1973 | Goldsworthy et al. | 156/244.13 |
| 3,883,384 | 5/1975 | Hopkins | 264/173 |
| 4,155,790 | 5/1979 | Galloway | 264/173 |
| 4,214,026 | 7/1980 | Ibata et al. | 156/244.17 |
| 4,289,555 | 9/1981 | Haren et al. | 156/244.13 |
| 4,302,266 | 11/1981 | Kutnyak | 156/244.13 |
| 4,311,547 | 1/1982 | Biggs et al. | 156/244.13 |
| 4,361,455 | 11/1982 | Arterburn | 156/244.13 |
| 4,371,415 | 2/1983 | Tanaka | 156/244.13 |

OTHER PUBLICATIONS

"Ultraviolet Light: Its Effects on Plastics" A. King, Plastics & Polymers Jun. 1968, pp. 195–203.

*Primary Examiner*—Jeffery Thurlow
*Assistant Examiner*—Patrick Dailey
*Attorney, Agent, or Firm*—Sherman & Shalloway

[57] ABSTRACT

A process for producing a composite plastic pipe, which comprises producing a thermoplastic resin pipe (I) by an extruder, covering the surface of the pipe (I) uniformly with a continuous fibrous reinforcing material (II) impregnated with a thermosetting resin in its axial direction by a draw molding method, helically winding a continuous fibrous reinforcing material (III) impregnated or not impregnated with a thermosetting resin uniformly on the layer of the resin fibrous reinforcing material (II) by a filament winding method, thereafter curing the thermosetting resin by irradiation of ultraviolet light and coating a thermoplastic resin (IV) on the resulting product within a crosshead die in an extruder.

12 Claims, 1 Drawing Figure

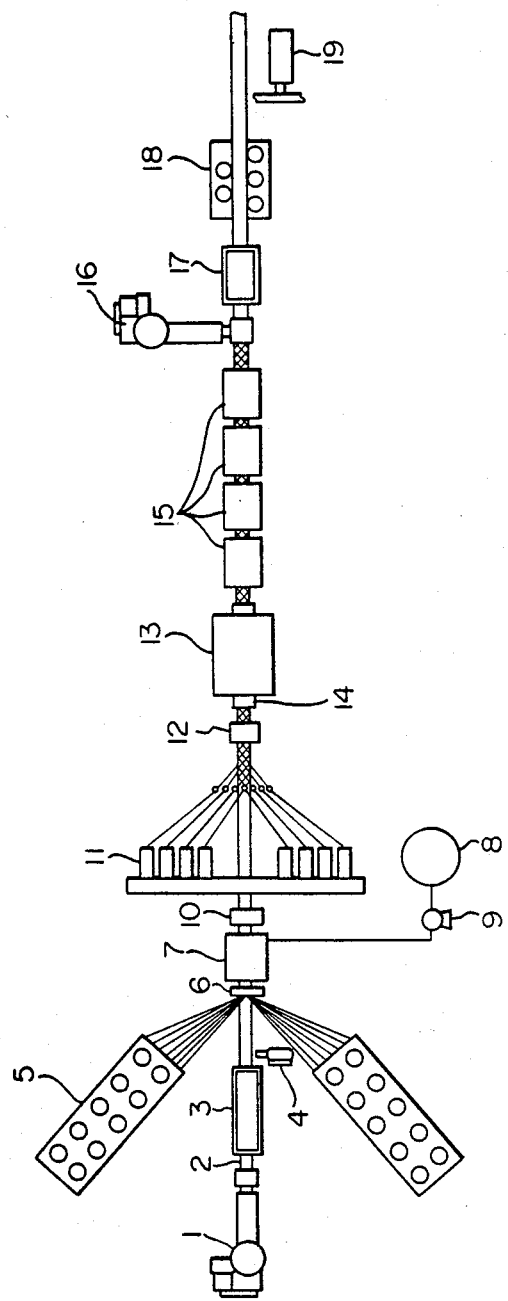

PROCESS FOR PRODUCING COMPOSITE PLASTIC PIPE

This application is a continuation-in-part application of U.S. Ser. No. 267,769 filed on May 28, 1981 now abandoned.

This invention relates to a composite plastic pipe composed of a pipe of a thermoplastic resin as a core, an interlayer of a thermosetting resin-impregnated fibrous reinforcing material (to be abbreviated FRP) having strength and rigidity both in the axial and circumferential directions and a thermoplastic resin coated layer as an outermost layer, and to a process for its production.

Thermoplastic resin pipes have previously been used in various applications because of their excellent chemical resistance and light weight, but have the defect of low rigidity.

Pipes of glass fiber-reinforced thermosetting resins have high rigidity. These pipes has high strength mainly in the circumferential direction when they are molded by a filament winding method using a mandrel, and mainly in the axial direction when they are molded by a pultrusion molding method, but have the defect that their strength in a perpendicular direction is inferior in both cases.

It is an object of this invention to provide a pipe which has the excellent properties of both a thermoplastic resin pipe and a glass fiber-reinforced thermosetting resin pipe.

We have now found that the above object is achieved by a composite pipe which is produced by uniformly covering the surface of a thermoplastic resin pipe (I) in its axial direction with a continuous fibrous reinforcing material (II) impregnated with a thermosetting resin, thereafter helically covering the layer of the fibrous reinforcing material (II) uniformly with a continuous fibrous reinforcing material (III) impregnated or not impregnated with a thermosetting resin, then curing the thermosetting resin, and coating a thermoplastic resin (IV) on the resulting assembly.

The thermoplastic resin pipe (I) used in this invention (to be abbreviated pipe (I)) is usually produced continuously by an extruder. Generally, the pipe (I) has a thickness of 0.05 to 1.5 cm, preferably 0.1 to 0.5 cm, and a diameter of 1.5 to 60 cm, preferably 1.0 to 20 cm.

The pipe (I) is produced from ordinary thermoplastic resin preferably having a tensile strength (ASTM D-638) of at least 250 kg/cm². Examples of such a thermoplastic resin include olefin polymers such as polyethylene, polypropylene and polyisobutylene; styrene polymers such as polystyrene, an acrylonitrile/styrene copolymer and an acrylonitrile/butadiene/styrene copolymer; polyamides such as 6-nylon, 6,6-nylon and 6,10-nylon; vinyl chloride polymers such as polyvinyl chloride, a vinyl chloride/vinyl acetate copolymer, a vinyl chloride/acrylonitrile copolymer and a vinyl chloride/ethylene copolymer; fluorocarbon polymers such as polytetrafluoroethylene, polytrifluoroethylene and polytetrafluorobutylene; polyesters such as polyethylene terephthalate, polypropylene terephthalate and polybutylene terephthalate; polycarbonates having a structural recurring unit of the general formula

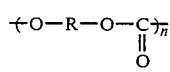

wherein R is a divalent residue such as a bisphenol A residue or an alkylene group; polyphenylene oxide polymers having a recurring structural unit of the general formula

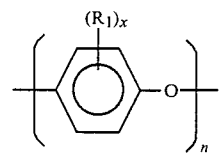

wherein $R_1$ is an alkyl group or a halogen atom and x is an integer of 1 to 4; polyphenylene sulfide polymers having a recurring structural unit of the general formula

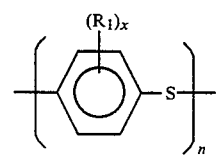

wherein $R_1$ and x are as defined; polyphenylene sulfone polymers having a recurring structural unit of the general formula

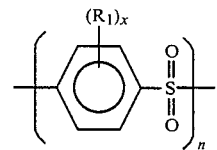

wherein $R_1$ and x are as defined; polyacetals such as a homopolymer or copolymer of formaldehyde or trioxan; and polymethacrylate polymers such as polymethacrylates, methacrylate/styrene copolymers and methacrylate/acrylate copolymers. The vinyl chloride polymers and olefin polymers are especially preferred. In the present invention these thermoplastic resins may be used in combination.

The continuous fibrous reinforcing materials (II) and (III) impregnated with a thermosetting resin used in the composite pipe of this invention (to be referred to as reinforcing materials (II, III)) are usually obtained by impregnating a continuous fibrous reinforcing material with a liquid thermosetting resin. Examples of the liquid thermosetting resin are unsaturated polyester resins, unsaturated carboxylic acid-modified vinyl ester resins, epoxy resins, and phenolic resins. When the thermosetting resin impregnated in the reinforcing material (II, III) is to be cured under heat, no particular additive is required. But when it is to be cured under ultraviolet irradiation, the reinforcing material (II, III) suitably contains a liquid unsaturated resin such as unsaturated polyester resins, unsaturated carboxylic acid-modified vinyl ester resins, a photopolymerization initiator, a curing catalyst and a curing accelerator.

Examples of such a photopolymerization initiator are benzoin, azo and diphenyl sulfide compounds, and especially preferred are benzoin compounds such as benzoin methyl ether, benzoin ethyl ether, benzoin isopropyl ether and benzoin n-butyl ether.

Any curing catalysts which are usually employed for curing unsaturated polyester resins can be used in this invention. Examples are organic peroxides such as t-butyl peracetate, t-butyl perpivalate, t-butyl perisobutyrate, methyl ethyl ketone peroxide, benzoyl peroxide, t-butyl perbenzoate, lauroyl peroxide, acetyl peroxide, t-butyl hydroperoxide and cyclohexanone peroxide.

Examples of the curing accelerators include metal soaps such as cobalt naphthenate and cobalt octoate, and tertiary amines such as dimethylaniline, N,N-diethylaniline and triethanolamine.

The unsaturated polyester resins may be those which are normally used, and they are used in combination with liquid vinyl monomers capable of forming hard polymers, such as styrene, vinyltoluene, α-methylstyrene and methyl methacrylate. Suitable unsaturated carboxylic acid-modified vinyl esters are those obtained by reacting polyepoxy compounds with unsaturated monocarboxylic acids, and they are used in combination with the aforesaid liquid vinyl monomers.

The reinforcing materials (II) and (III) used in this invention usually consist of a continuous fibrous reinforcing material containing 20 to 45% by weight, preferably 25 to 35% by weight, of a liquid thermosetting resin. The reinforcing material (III) may sometimes be used without impregnation of a thermosetting resin as stated hereinabove.

The continuous fibrous reinforcing material used in the reinforcing materials (II) and (III) in this invention is a roving or yarn composed of fibers such as glass fibers, metallic fibers, kevlar fibers, carbon fibers, nylon fibers, rayon fibers and polyester fibers. A glass roving consisting of a bundle of several hundred glass filaments having a diameter of 8 to 25 microns, for example 200 to 400 such glass filaments, is preferred.

The thermoplastic resin (IV) to be coated as the outermost layer may be the same thermoplastic resin as that used in the pipe (I). Any thermoplastic resin which has a tensile strength (ASTM D-638) of at least 50 kg/cm$^2$ can be used in this invention. Thus, for example, polyurethane resins can also be used.

The thicknesses of the reinforcing material (II) layer and the reinforcing material (III) layer in the composite plastic pipe of this invention are optional. Usually, the thicknesses are such that, for example, the reinforcing material (II) in the form of a roving is applied once to the entire surface of the pipe (I) in its axial direction and then the reinforcing material (III) is applied helically once to the entire pipe surface. Of course, the degree of application of the reinforcing materials (II) and (III) in the axial direction and the helical direction can be varied depending upon the properties of the desired composite plastic pipe.

When the reinforcing material (III) not containing a thermosetting resin is used, the reinforcing material is uniformly wound helically on the entire surface of the reinforcing material (II) layer before the thermosetting resin in the reinforcing material (II) is cured.

Since the thermoplastic resin (IV) is to be coated as an outermost layer of the composite plastic pipe, its thickness should be determined in consideration of corrosion resistance and abrasion resistance. Usually, the thickness of the thermoplastic resin (IV) layer is 0.3 to 10 mm, preferably 0.5 to 2.0 mm.

The composite plastic pipe of this invention can be produced, for example, by forming the pipe (I) by extrusion molding through an extruder, covering the entire surface of the pipe (I) in its axial direction with a reinforcing material (II) in the form of a roving obtained by impregnating a fibrous reinforcing material with a liquid thermosetting resin, then helically winding the reinforcing material (III) uniformly on the entire surface of the reinforcing material (II) layer, and then coating the assembly with the molten thermoplastic resin (IV). Preferably, after the winding of the reinforcing material (III), the assembly is passed through a die such as a glass pipe, quartz pipe or transparent plastic pipe to smoothen its surface and finish it to the desired thickness.

Each of FRP layers obtained by impregnating roving-like fibrous reinforcing materials (II) and (III) with a liquid thermosetting resin is cured by irradiation of ultraviolet light. While the thermoplastic pipe (I) coated with the FRP layers passes through an ultraviolet irradiating device, the irradiation of ultraviolet light is performed at a surface temperature of the composite pipe that does not deform the pipe (I) with heat given by the irradiation and heat involved in the curing reaction of the resin and under such conditions as to cure the respective FRP layers. Therefore, a length, output and number of an ultraviolet lamp and a distance between the ultraviolet lamp and a product to undergo irradiation and properly selected. That is, at least one, preferably 2 to 8 high-pressure mercury lamps of at least 1,000 W, preferably 1,000 to 10,000 W having a length of, usually 30 to 300 cm, preferably 50 to 180 cm are used as the ultraviolet lamp. The distance between the high-pressure mercury lamp and the product to undergo irradiation is usually 5 to 50 cm, preferably 10 to 30 cm, and the time of irradiation is usually 3 to 120 seconds, preferably 5 to 40 seconds.

The irradiation of ultraviolet light may be conducted not only once but also two or more times. The dose of ultraviolet light varies with type of the thermoplastic resin used in the pipe (I). For instance, it is advisable that in the case of a vinyl chloride resin with a relatively low heat deformation temperature, the irradiation is performed so that the surface temperature of the composite pipe immediately after being withdrawn from the ultraviolet irradiating device becomes less than 80° C., and in the case of polycarbonate with a relatively high heat deformation temperature, it is performed so that said surface temperature becomes less than 100° C.

After the irradiation of ultraviolet light, the curing may be further conducted in a heating oven such as a far infrared oven, hot-air oven, etc. in order to fully cure the FRP layers.

One specific example of the production of the composite plastic pipe of this invention is illustrated with reference to the accompanying drawing.

BRIEF DESCRIPTION OF THE DRAWINGS

The FIGURE shows a schematic drawing of one of the specific embodiments of the invention.

A thermoplastic resin pipe 2 is continuously extruded from an extruder 1, and cooled and solidified in a cooling tank 3. For removing moisture, the surface of the pipe 2 is treated with a blower dryer 4. In the meantime, glass filaments are arranged on a bookshelf-type creel 5, and passed through a glass bundling device 6. The glass rovings formed are introduced into a resin impregnating bath 7 to impregnate then with a thermosetting resin. The thermosetting resin is mixed with a photopolymerization initiator, a catalyst and an accelerator in a mixing tank 8, and continuously introduced into the impregnating bath 7 by means of a pump 9. To control the ratio of the resin impregnated, squeeze rolls for adjusting the ratio of the resin to a fixed value are provided in the resin impregnating bath 7. The resin-impregnated glass rovings are aligned axially along the surface of the thermoplastic resin pipe 2 by a pre-forming die 10. If the thermosetting resin-impregnated fibrous reinforcing material is introduced only in the axial direction as in the above-mentioned case, the strength characteristics of the resulting composite pipe are localized. Accordingly, to increase the strength characteristics of the pipe in its hoop direction, the glass filaments are wound helically about the surface of the axially reinforced pipe from a filament winder 11. The angle of winding can be varied between 30 to 90 degrees by varying the relation between the extrusion (or take-up) speed of the extruded pipe and the rotating speed of the filament winder 11. After winding the glass filaments helically, the assembly is introduced into an impregnation die 12, and squeezed therein. As a result, the resin oozes out from the glass rovings aligned axially and is also impregnated into the glass filaments wound in the helical direction.

When the resulting assembly is passed through an ultraviolet light-permeable die 14 provided in an ultraviolet radiating device 13, the photopolymerization initiator acts to gel and cure the resin, and the assembly is molded. After the molding, the product is introduced into a first to fourth far infrared ray curing ovens 15, and curing of the thermosetting resin is promoted at about 80° to about 120° C. by the action of the accelerator and the catalyst without so much raising the temperature.

Furthermore, to improve the dimensional accuracy, weatherability, abrasion resistance, and handleability of the surface of the final composite pipe, a thermoplastic resin was coated on the surface of the pipe using an extruder 16 and a cooling tank 17 to form a three-layer composite pipe. It is then continuously taken up by a pullar unit 18, and cut automatically to the specified lengths by a cutoff saw 19. Thus, composite pipes are continuously produced.

The composite pipe of this invention has excellent chemical resistance, abrasion resistance and mechanical properties because it is a product of a unitary structure produced by forming an FRP-reinforced interlayer on the outside surface of a thermoplastic resin pipe both axially and helically, and then coating the outside surface of the interlayer with a thermoplastic resin.

The composite plastic pipe of this invention obtained by applying a continuous fibrous reinforcing material (III) having no thermosetting resin impregnated therein to the continuous fibrous reinforcing material (II) impregnated with a thermosetting resin has sufficient adhesion between the interlayer (FRP) and the outermost layer (thermoplastic resin) and shows excellent strength because the thermosetting resin in the reinforcing material (II) penetrates into some of the interstices in the reinforcing material (II) and cured, and at the same time, the molten thermoplastic resin (IV) penetrates into the other interstices of the reinforcing material (III) and solidifies in the intermeshing state.

The composite plastic pipe of this invention can be used in various applications, for example for transporting cold or hot water, cables, irrigating liquids, supports for street-lighting lamps and supports for fish cultivating nets. These are only some examples, and it may find applications in other various industrial and household materials.

The following Examples illustrate the present invention more specifically. All parts and percentages in these examples are by weight.

EXAMPLE 1

A core pipe having a thickness of 1.5 mm and an outside diameter of 40 mm was produced from a hard polyvinyl chloride by an extruder. Two hundred glass rovings (unit weight 2.5 g/m) were gathered through a bundling plate from a glass hunger and dipped in the resin impregnating tank containing Polylite HN-210 (an unsaturated polyester resin produced by Dainippon Ink & Chemicals, Inc.) premixed with 1% of benzoin ethyl ether as a photopolymerization initiator.

Since in the resin tank, a high resistance is generated owing to the viscosity of the resin, there tend to occur disorder in the arrangement of glass rovings, entanglement of the fibers, the filament breakage, etc. In order to prevent this, guides were provided in the tank so as to bundle 150 glass rovings into 25 bundles each consisting of 6 rovings, and in this state, the glass rovings were impregnated with the resin. Then, the bundled glass rovings were passed through a preform bundling ring having 25 cylindrical holes, and applied uniformly to the surface of the core pipe in its axial direction. The covered pipe was then passed through a die to determine its shape and thickness. In order to adjust the thickness of the fiber reinforced thermosetting resin layer to 2.0 mm, a tapered die having an inside diameter of 44 mm was used. The optimum taper angle was found to be 30° to 45° in view of the disorder of the glass rovings or the resistance at the time of squeezing the resin. A layer consisting of 35% of the resin and 65% of the glass fibers was obtained as a result of squeezing with this die. Next, sixteen glass rovings having a unit weight of 2.5 g/m set in a yarn winder were continuously wound helically and uniformly about the previously pultruded core at an angle of about 60° to the axis by a filament winder. As a result, a part of the resin was caused to ooze out from the resin-impregnated glass rovings applied axially, and impregnated in the helically wound glass rovings. The product was then drawn into a transparent quartz pipe die having an inside diameter of 70 mm, a length of 2000 mm and a thickness of 3 mm provided in an ultraviolet irradiating device including two 4000 W mercury lamps for photo-polymerization with each length of 1500 mm, and ultraviolet light was irradiated for about 15 seconds to gel and cure the thermosetting resin. The surface temperature of the composite pipe immediately after taken out from the ultraviolet curing oven was 79° C.

The entire operation was performed automatically in a line at a line speed of 6 meters/minute. After this ultraviolet curing, the pipe has a minimum barcol hardness of 45. Finally, an abrasion resistant thermoplastic polyurethane resin (Pandex T-5105S produced by Dainippon Ink & Chemicals, Inc.) at 200° C. was coated to a uniform thickness of 1 mm around the outside of the composite pipe using an extruder with a cross-head die. After cooling, the endless pipe was cut into 10 meter length by an automatic cut-off saw.

With this process, thermoset FRP/thermoplastic composite pipes, each having an outside diameter of 46 mm, a thickness of 4.5 mm and 10 meters in length, were continuously produces at the rate of 36 pieces per hour.

The composite pipe (1-I) having high adhesion and no deformation was subjected to a tensile shear peel test, and the results are shown in Table 1.

A composite pipe (1-II) was produced in the same way as above except that glass yarns having a unit weight of 2.5 g/m were not wound. The results of the tensile shear peel test of the composite pipe (1-II) are also shown in Table 1.

EXAMPLE 2

Polycarbonate resin was extruded by an extrusion molding machine into a core pipe having an outer diameter of 40 mm and a thickness of 1.5 mm. One-hundred and fifty glass rovings (unit weight 2.3 g/m) were aligned on the surface of the core pipe in its axial direction through a bundling plate, and the assembly was passed through a tank containing 1% of benzoin ethyl ether as a photopolymerization initiator, 0.1% of 6% cobalt naphthenate as an accelerator, 1.0% of methyl ethyl ketone peroxide and the same unsaturated polyester resin as in Example 1, and was impregnated with the resin.

The covered pipe was then passed through a die to determine its shape and thickness. In order to adjust the thickness of the fiber reinforced thermosetting resin layer to 2.5 mm, a tapered die having an inside diameter of 45 mm was used. The optimum taper angle was found to be 30° to 45° in view of the disorder to the glass rovings or the resistance at the time of squeezing the resin. A layer consisting of 35% of the resin and 65% of the glass fibers was obtained as a result of squeezing with this die. Glass yarns having a unit weight of 2.3 g/m wound on this layer helically in the right direction using a filament winder, and another glass yarns having a unit weight of 2.3 g/m were wound helically in the left direction by the filament winder. About half of the glass yarns were consequently impregnated with the resin (18% by weight). (When the amount of the resin impregnated is at least 40%, the glass yarns having a unit weight of 2.3 g/m will be totally impregnated.)

As in Example 1, the resulting pipe was led to an ultraviolet irradiating device having four high-pressure mercury lamps where it was irradiated with ultraviolet light for 13 seconds to cure the FRP layers. There was obtained a composite pipe having a minimum surface barcol hardness of 39. The surface temperature of the composite pipe immediately after withdrawn from the ultraviolet irradiating device was 98° C. The pipe was further postcured at a temperature of 100° C. in a heating oven to afford a composite pipe having a minimum surface barcol hardness of 45.

There was obtained a pipe having a cured FRP layer with unimpregnated portions. Using an extrusion coating machine, polyethylene was melted and coated to a thickness of 1.0 mm on the cured FRP layer by a crosshead die (the length of the die in its parallel part was adjusted to 8 mm to 15 mm.). Thus, the polyethylene in the outside layer penetrated into the unimpregnated glass fibers to give a unitary composite pipe (2-I) having high adhesion and no deformation. The composite pipe (2-I) was subjected to a tensile shear peel test, and the results are shown in Table 1.

A composite pipe (2-II) was produced in the same way as above except that glass yarns having a unit weight of 2.3 m/g were not wound. The results of the tensile shear peel test of the composite pipe (2-II) are also shown in Table 1.

EXAMPLE 3

A composite pipe (3-I) was produced in the same way as in Example 1 except that a polypropylene core pipe was used instead of the core pipe of thermally stable hard polyvinyl chloride. The composite pipe (3-I) was subjected to the shear peel strength test and the results are shown in Table 1.

Furthermore, in the same way as in Example 2, a composite pipe (3-II) not covered with glass yarns was produced, and subjected to the shear peel strength test. the results are also shown in Table 1.

Said composite pipes (2-I) and (2-II) were both produced continuously at a line speed of 7 m/min. in a production line.

TABLE 1

|  | Example 1 | | Example 2 | | Example 3 | |
| --- | --- | --- | --- | --- | --- | --- |
| Composite plastic pipe | 1-I | 1-II | 2-I | 2-II | 3-I | 3-II |
| Core pipe material | Hard polyvinyl chlorive | | Polycarbonate | | Polypropylene | |
| Tensile shear peel strength (kg/cm$^2$) | 70 | 45 | 68 | 42 | 30 | 10 |

NOTE:
Tensile shear peel strength: tested in accordance with JIS K-6829.

COMPARATIVE EXAMPLE 1

The procedure of Example 1 was followed except that a curing oven with two far infrared lamps of 1500 W each having a length of 1500 mm was used in place of the device with the high-pressure mercury lamps. There resulted a product with the unsaturated polyester resin remaining liquid.

COMPARATIVE EXAMPLE 2

A core pipe having a thickness of 1.5 mm and an outside diameter of 40 mm was produced from a hard polyvinyl chloride by an extruder. A resin composition obtained by adding 1.0% of 6% cobalt naphthenate as an accelerator and 1.0% of methyl ethyl ketone peroxide to the same unsaturated polyester resin as used in Example 1 was fed to a resin impregnating tank. Two hundred glass rovings having a unit weight of 2.5 g/m were gathered through a bundling plate from a glass hanger and dipped in the resin impregnating tank. The resulting resin-impregnated glass rovings were arranged in a circular shape by means of a pre-forming die provided so as to align the rovings according to the shape of the core pipe, and applied uniformly to the entire surface of the core pipe in its axial direction. Sixteen glass rovings having a unit weight of 2.5 g/m set in a yarn winder were continuously wound helically and uniformly about the coated surface of the core pipe covered surface of the core pipe at an angle of about 60° to the axis, and the surface of the helically wound glass rovings was held by an impregnation die. As a result, a part of the resin was caused to ooze out from the resin-impregnated glass rovings applied axially, and impregnated in the helically wound glass rovings. The product was then introduced into an oven with a length of 1500 mm whose temperature of atmosphere was adjusted to 80° C. The FRP layers were then cured and a thermoplastic polyurethane resin was coated as in Example 1. The resulting pipe could withstand use viewed from properties, but the production line speed was as low as 0.75 m/min.

COMPARATIVE EXAMPLE 3

The procedure of Comparative Example 2 was followed except that the line speed was more than 0.75 m/min. The resulting pipe was poor in strength.

COMPARATIVE EXAMPLE 4

A composite pipe was produced as in Comparative Example 2 except that the temperature of atmosphere of the oven was 90° C. The resulting composite pipe was deformed.

COMPARATIVE EXAMPLE 5

The procedure of Comparative Example 2 was repeated except that the amounts of the curing accelerator (6% cobalt naphthenate) and curing catalyst (methyl ethyl ketone peroxide) of the unsaturated polyester resin were changed to 0.1 to 2.5% and 0.1 to 2.5% respectively. However, the production speed of the composite pipe was at most 1.0 m/min.

EXAMPLE 4

A core pipe was produced by extruding non-colored hard polyvinyl chloride of general grade from an extruder equipped with an extrusion die having an outside diameter of 38 mm and a thickness of 1.2 mm. In the meantime, a thermosetting resin mixture was prepared by mixing in a mixing tank 50 parts of Polylite PB-101 (an unsaturated polyester resin, a product of Dainippon Ink and Chemical Inc.), 50 parts of Polylite FG-208 (an unsaturated polyester resin, a product of Dainippon Ink and Chemicals, Inc.), 1 part of benzoin ethyl ether (photosensitizer) 0.1 part of 6% cobalt naphthenate (accelerator) and 1.0 part of methyl ethyl ketone peroxide (catalyst). The resin mixture was fed into a resin impregnating tank by a pump. One hundred and sixty glass rovings having a unit weight of 2.5 g/m were introduced into the resin impregnating tank, and the above heat-setting resin mixture was impregnated in the glass rovings. The resin-impregnated glass rovings were uniformly applied to the surface of the core pipe in its axial direction by means of a pre-forming die. Then, 32 glass rovings (2.5 g/m) were helically wound uniformly on the impregnated glass roving layer at an angle of about 53° to the pipe axis using a filament winder. The product was passed through an impregnation die, and while it was pulled out from a transparent quartz die having a length of 1.5 m at a rate of 6 m/min., was subjected to irradiation of ultraviolet light by four 4000 W high pressure mercury lamps for photopolymerization arranged above and below the product being pulled out, thereby gelling and curing the thermosetting resin. As a result, the thermosetting resin was cured to a Barcol hardness (GYZJ 934-1) of at least 50.

The surface of the resulting product was coated with an abrasion-resistant thermoplastic urethane resin to form a three-layer composite pipe.

What is claimed is:

1. A process for producing a composite plastic pipe, which comprises producing a thermoplastic resin pipe (I) by an extruder, covering the surface of the pipe (I) uniformly with a continuous fibrous reinforcing material (II) impregnated with a thermosetting resin selected from the group consisting of unsaturated polyester resins and unsaturated carboxylic acid-modified vinyl ester in its axial direction by a draw molding method, helically winding a continuous fibrous reinforcing material (III) impregnated or not impregnated with the thermosetting resin uniformly on the layer of the resin fibrous reinforcing material (II) by a filament winding method, thereafter curing the thermosetting resin by irradiation of ultraviolet light and coating a thermosplastic resin (IV) on the resulting product within a crosshead die in an extruder.

2. A process for producing a composite plastic pipe, which comprises producing a thermoplastic resin pipe (I) by an extruder, covering the surface of the pipe (I) uniformly with a continuous fibrous reinforcing material (II) impregnated with a thermosetting resin selected from the group consisting of unsaturated polyester resins and unsaturated carboxylic acid-modified vinyl ester in its axial direction by a draw molding method, helically winding a continuous fibrous reinforcing material (III) impregnated or not impregnated with the thermosetting resin uniformly on the layer of the resin fibrous reinforcing material (II) by a filament winding method, thereafter curing the thermosetting resin by irradiation of ultraviolet light and then post-curing it by heating, and coating a thermoplastic resin (IV) on the resulting product within a crosshead die in an extruder.

3. The process of claim 1 wherein the thermoplastic resin pipe (I) is produced by using as a main component at least one resin selected from the group consisting of an olefin resin, a styrene resin, a polyamide resin, a vinyl chloride resin, a fluorocarbon resin, a polyester resin, a polycarbonate resin, a polyphenylene oxide resin, a polyphenylene sulfide resin, a polyphenylene sulfone resin, a polyacetal resin and a methacrylate resin.

4. The process of claim 1 wherein the continuous fibrous reinforcing material is a roving composed of fibers selected from the group consisting of glass fibers, metallic fibers, kevlar fibers, nylon fibers, rayon fibers and carbon fibers.

5. The process of claim 1 wherein the resin-impregnated continuous fibrous reinforcing materials (II) and (III) each contain 20 to 45% by weight of the thermosetting resin.

6. The process of claim 1 wherein the thermoplastic resin (IV) is selected from the group consisting of an olefin resin, a styrene resin, a polyamide resin, a vinyl chloride resin, a fluorocarbon resin, a polyester resin, a polycarbonate resin, a polyphenylene oxide resin, a polyphenylene sulfide resin, a polyphenylene sulfone resin, a polyacetal resin, a methacrylate resin, and a polyurethane resin.

7. The process of claim 1 wherein the continuous fibrous reinforcing material (II) contains a liquid unsaturated resin, a photopolymerization initiator, a curing accelerator and a curing catalyst.

8. The process of claim 1 wherein the continuous fibrous reinforcing material (III) is impregnated with a thermosetting resin.

9. The process of claim 1 wherein the continuous fibrous reinforcing material (III) is not impregnated with a thermosetting resin and wherein a portion of the thermosetting resin impregnated in the continuous fibrous reinforcing material (II) is caused to penetrate into some of the interstices in the reinforcing material (III) and the thermoplastic resin (IV) is caused to penetrate into the other interstices of the reinforcing material (III) whereby the layer of the helically wound continuous fibrous reinforcing material (III) is intimately bonded to the layer of the continuous fibrous reinforcing material (II) and also to the coating of the thermoplastic resin (IV).

10. The process of claim 2 wherein the continuous fibrous reinforcing material (II) contains a liquid unsaturated resin, a photopolymerization initiator, a curing accelerator and a curing catalyst.

11. The process of claim 2 wherein the continuous fibrous reinforcing material (III) is impregnated with a thermosetting resin.

12. The process of claim 2 wherein the continuous fibrous reinforcing material (III) is not impregnated with a thermosetting resin and wherein a portion of the thermosetting resin impregnated in the continuous fibrous reinforcing material (II) is caused to penetrate into some of the interstices in the reinforcing material (III) and the thermoplastic resin (IV) is caused to penetrate into some of the interstices of the reinforcing material (III) whereby the layer of the helically wound continuous fibrous reinforcing material (III) is intimately bonded to the layer of the continuous fibrous reinforcing material (II) and also to the coating of the thermoplastic resin (IV).

* * * * *

UNITED STATES PATENT AND TRADEMARK OFFICE
CERTIFICATE OF CORRECTION

PATENT NO. : 4,515,737
DATED : May 7, 1985
INVENTOR(S) : KARINO, ET AL.

It is certified that error appears in the above-identified patent and that said Letters Patent is hereby corrected as shown below:

On the title page;

[73] Assignee - delete "Dainippin", insert --Dainippon--.

Signed and Sealed this

Seventeenth Day of September 1985

[SEAL]

Attest:

DONALD J. QUIGG

Attesting Officer

Commissioner of Patents and
Trademarks—Designate